(12) United States Patent
Steinbrenner et al.

(10) Patent No.: US 6,870,014 B2
(45) Date of Patent: Mar. 22, 2005

(54) CATALYST AND METHOD FOR PRODUCING POLYTETRAHYDROFURANE

(75) Inventors: Ulrich Steinbrenner, Neustadt (DE); Thomas Narbeshuber, Ibbenbüren (DE); Martin Haubner, Limburgerhof (DE); Christoph Sigwart, Schriesheim (DE); Gerd Linden, Heidelberg (DE); Gerhard Cox, Bad Dürkheim (DE); Rolf-Hartmuth Fischer, Heidelberg (DE); Michael Hesse, Worms (DE); Gerd Bohner, Malsch (DE); Hartmut Hibst, Schriesheim (DE); Ekkehard Schwab, Neustadt (DE); Andreas Tenten, Maikammer (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/312,860

(22) PCT Filed: Jul. 2, 2001

(86) PCT No.: PCT/EP01/07545

§ 371 (c)(1),
(2), (4) Date: Jan. 2, 2003

(87) PCT Pub. No.: WO02/02671

PCT Pub. Date: Jan. 10, 2002

(65) Prior Publication Data

US 2003/0186806 A1 Oct. 2, 2003

(30) Foreign Application Priority Data

Jul. 3, 2000 (DE) ......................................... 100 32 268
Jul. 3, 2000 (DE) ......................................... 100 32 267
Feb. 9, 2001 (DE) ......................................... 101 05 970

(51) Int. Cl.$^7$ ............................. C08F 4/06; C08F 4/40; C08F 4/42; C08F 124/00; B01J 23/00

(52) U.S. Cl. ......................... 526/90; 526/91; 526/266; 526/268; 526/270; 526/271; 502/254; 502/255; 502/305; 502/308; 502/309; 502/321; 502/349; 502/350; 502/439

(58) Field of Search ................................. 502/254, 255, 502/305, 308, 309, 321, 349, 350, 439; 526/90, 91, 266, 268, 270, 271

(56) References Cited

U.S. PATENT DOCUMENTS

| | | | | |
|---|---|---|---|---|
| 4,016,106 A | | 4/1977 | Sawyer et al. | |
| 4,028,482 A | * | 6/1977 | Ueshima et al. | 526/271 |
| 4,051,172 A | * | 9/1977 | Dawans et al. | 526/90 |
| 4,225,421 A | | 9/1980 | Hensley, Jr. et al. | |
| 4,257,922 A | | 3/1981 | Kim et al. | |
| 4,269,737 A | * | 5/1981 | Grenoble et al. | 502/204 |
| 4,720,472 A | * | 1/1988 | Parrott | 502/211 |
| 4,769,429 A | * | 9/1988 | Furtek | 526/129 |
| 4,789,654 A | * | 12/1988 | Hirano et al. | 502/66 |
| 4,810,361 A | * | 3/1989 | Absil et al. | 208/213 |
| 4,886,582 A | * | 12/1989 | Simpson | 502/211 |
| 4,886,594 A | * | 12/1989 | Miller | 208/210 |
| 5,037,791 A | * | 8/1991 | Comolli et al. | 502/185 |
| 5,192,734 A | * | 3/1993 | Creighton et al. | 502/314 |
| 5,384,297 A | * | 1/1995 | Prada et al. | 502/66 |
| 5,558,766 A | * | 9/1996 | Prada et al. | 208/59 |
| 5,578,740 A | * | 11/1996 | Au et al. | 549/525 |
| 5,773,648 A | | 6/1998 | Becker et al. | |
| 5,824,825 A | * | 10/1998 | Lansink-Rotgerink et al. | 568/898 |
| 5,897,769 A | * | 4/1999 | Trachte et al. | 208/263 |
| 6,037,306 A | * | 3/2000 | Xia et al. | 502/315 |
| 6,096,189 A | * | 8/2000 | Cody et al. | 208/87 |
| 6,111,147 A | | 8/2000 | Sigwart et al. | |
| 6,300,450 B1 | * | 10/2001 | Tsujimoto et al. | 526/335 |
| 6,419,889 B1 | * | 7/2002 | Boxhoorn et al. | 423/239.1 |

FOREIGN PATENT DOCUMENTS

| | | |
|---|---|---|
| DE | 44 33 606 | 3/1996 |
| DE | 196 41481 | 4/1998 |

* cited by examiner

*Primary Examiner*—Cam N. Nguyen
(74) *Attorney, Agent, or Firm*—Novak, Druce, DeLuca & Qüigg

(57) ABSTRACT

The invention relates to a catalyst which contains a catalytically active quantity of at least one oxygen-containing molybdenum and/or wolfram compound on an oxidic support material and which has been calcinated at temperatures of 400 to 900° C. after the precursor compound of the catalytically active compounds have been applied to the support material or to a support material precursor. The transport pores for this catalyst each have a diameter of >25 nm and a volume of at least 50 mm$^3$/g. The catalyst contains x $\mu$mol (wolfram and/or molybdenum)/m$^2$ molybdenum and/or wolfram, with 10.1<x<20.9 in relation to the finished catalyst, with the oxidic support material having a BET surface area of 135 to 220 m$^2$/g. Catalysts of this type are characterized by an acidity of at least 70 $\mu$mol/g at pKs<−3 in the dry state and are therfore very active. The invention also relates to a method for producing a catalyst of this type and to the preferred use thereof.

33 Claims, No Drawings

CATALYST AND METHOD FOR PRODUCING POLYTETRAHYDROFURANE

BACKGROUND OF THE INVENTION (1) Field of the Invention

The present invention relates to a catalyst which comprises a catalytically active amount of at least one oxygen-containing molybdenum and/or tungsten compound on an oxidic support material and has been calcined at from 400° C. to 900° C. after application of the precursor compounds of the catalytically active compounds to the support material or a support material precursor, and to a process for preparing it. This catalyst is used in processes for preparing polytetrahydrofuran, tetrahydrofuran copolymers and diesters or monoesters of these polymers.

Polytetrahydrofuran, hereinafter referred to as PTHF for short, which is also known as polyoxybutylene glycol, is used as a versatile intermediate in the plastics and synthetic fibers industries and is employed, inter alia, for producing polyurethane, polyester and polyamide elastomers. In addition, it is, possibly in the form of its derivatives, a valuable auxiliary in a variety of applications, e.g. as dispersant or in the deinking of waste paper.

Industrially, PTHF is advantageously prepared by polymerization of tetrahydrofuran over suitable catalysts. Additional reagents whose addition makes it possible to control the chain length of the polymer chains and thus to set the mean molecular weight to the desired value are used in this process. Such chain termination reagents are also known as "telogens". The chain length is controlled via selection of type and amount of telogen. Choice of suitable telogens additionally makes it possible to introduce functional groups at one end or at both ends of the polymer chain. For example, use of carboxylic acids or carboxylic anhydrides as telogens makes it possible to prepare the monoesters or diesters of PTHF. Other telogens act not only as chain termination reagents but are also incorporated into the growing polymer chain of PTHF and have the function of both a telogen and a comonomer. Examples of such comonomers are telogens having two hydroxy groups, for example dialcohols. Examples of such dialcohols are ethylene glycol, propylene glycol, butylene glycol, 1,4-butanediol, 2-butyne-1,4-diol, 1,6-hexanediol or low molecular weight PTHF. The use of such comonomers leads to tetrahydrofuran copolymers. In this way, the PTHF can also be chemically modified. An example is the use of the telogen 2-butyne-1,4-diol whose addition leads to the presence of a proportion of C—C triple bonds in the polymer chains of the PTHF. PTHF which has been modified in this way can be further modified chemically at these points due to the reactivity of these triple bonds, e.g. by hydrogenation of the triple bonds to form double bonds, by subsequent grafting of other monomers to adjust the properties of the polymer, crosslinking to form polymers having a comparatively rigid structure or other customary measures of polymer chemistry. Complete hydrogenation of the triple bonds present is likewise possible and generally leads to PTHF having a particularly low color number.

Industrially, the preparation of PTHF is predominantly carried out by two-stage processes in which tetrahydrofuran is, for example, polymerized in the presence of fluorosulfonic acid to form PTHF esters which are subsequently hydrolyzed to give PTHF. In a further two-stage process, tetrahydrofuran is polymerized with acetic anhydride in the presence of acid catalysts to form PTHF diacetate which is subsequently transesterified with methanol to give PTHF. Apart from the fact that a two-stage process has to be carried out, a particularly disadvantageous factor is that by-products such as hydrofluoric acid or methyl acetate are formed.

Single-stage processes for preparing PTHF in which tetrahydrofuran is polymerized using diols, water or low molecular weight PTHF as telogen over acid catalysts are also known. The catalyst or the catalyst system can be homogeneous, i.e. present in solution in the reaction system, or it is possible to use heterogeneous, largely undissolved catalyst systems.

(2) Description of Related Art Including Information Disclosed Under 37 CFR 1.97 and 1.98.

DE-A-44 33 606 describes a process for preparing PTHF, PTHF diesters of $C_2$–$C_{20}$-monocarboxylic acids or PTHF monoesters of $C_1$–$C_{10}$-monocarboxylic acids by polymerization of tetrahydrofuran over a heterogeneous catalyst in the presence of one of the telogens water, 1,4-butanediol, PTHF having a molecular weight of from 200 to 700 dalton, a $C_1$–$C_{10}$-monocarboxylic acid or a carboxylic anhydride of a $C_2$–$C_{20}$-monocarboxylic acid or a mixture of these telogens, where the catalyst is a supported catalyst comprising a catalytically active amount of an oxygen-containing tungsten or molybdenum compound or a mixture of these compounds on an oxidic support material and has been calcined at from 500° C. to 1000° C. after application of precursor compounds of the oxygen-containing molybdenum and/or tungsten compounds to the support material precursor.

DE-A-196 41 481 discloses a process for preparing polytetrahydrofuran, copolymers of tetrahydrofuran in 2-butyne-1,4-diol, diesters of these polymers with $C_2$–$C_{20}$-monocarboxylic acids or monoesters of these polymers with $C_1$–$C_{10}$-monocarboxylic acids by polymerization of tetrahydrofuran in the presence of one of the telogens water, 1,4-butanediol, 2-butyne-1,4-diol, polytetrahydrofuran having a molecular weight of from 200 to 700 dalton, a $C_1$–$C_{10}$-monocarboxylic acid or a carboxylic anhydride of a $C_2$–$C_{20}$-monocarboxylic acid or a mixture of these telogens over a heterogeneous support catalyst. The supported catalyst comprises a catalytically active amount of an oxygen-containing molybdenum and/or tungsten compound on an oxidic support material and has been calcined at from 500° C. to 1000° C. after application of precursor compounds of the oxygen-containing molybdenum and/or tungsten compounds to the support material precursor and activated by treatment with a reducing agent before being used as polymerization catalyst.

It is an object of the present invention to provide a catalyst which has a higher activity than the known catalysts so as to achieve higher polymer yields and/or space-time yields.

BRIEF SUMMARY OF THE INVENTION

We have found that this object is achieved by a catalyst which comprises a catalytically active amount of at least one oxygen-containing molybdenum and/or tungsten compound on an oxidic support material and has been calcined at from 400° C. to 900° C. after application of precursor compounds of the catalytically active compounds to the support material or a support material precursor, wherein the catalyst has a porosity comprising transport pores having a diameter of >25 nm and a volume of these transport pores of at least 50 mm$^3$/g.

DETAILED DESCRIPTION OF THE INVENTION

In a further embodiment, the catalyst of the present invention has a molybdenum and/or tungsten content, based on the finished catalyst, of x μmol of (tungsten and/or molybdenum)/m², where $10.1 < x < 20.9$. This targeted setting of the ratio of the tungsten and/or molybdenum content to the BET surface area enables a further significant increase in the catalyst activity to be obtained. This targeted setting is achieved by matching the calcination conditions to the tungsten and/or molybdenum content of the catalyst.

In a preferred embodiment, the catalyst of the present invention has a BET surface area of 25–200 m²/g, preferably 40–150 m²/g and particularly preferably 50–120 m²/g.

The oxidic material to which the catalytically active amount of the molybdenum and/or tungsten compound is applied has a BET surface area of 135–220 m²/g.

It has been found that catalysts whose oxidic support material has a BET surface area in the abovementioned range are particularly acidic and active. Laboratory tests have revealed that both the acidity and the activity of the catalysts decreases when the BET surface area is below the abovementioned range. Astonishingly, the acidity and the activity of the catalysts also decrease again when the BET surface area of the oxidic support material used is above the range claimed here.

In a preferred embodiment of the catalyst of the present invention, the BET surface area of the acidic support material is 170–220 m²/g, particularly preferably 190–220 m²/g.

The catalyst of the present invention can have an acidity at $pK_a$ of $<-3$ of at least 10 μmol/g. When such an oxidic support material whose BET surface area is in the abovementioned ranges is used, catalysts whose acidity at $pK_a$ $<-3$ is at least 70 μmol/g, preferably at least 90 μmol/g, in the dry state are obtained. Here, the $pK_a$ is determined by the Hammett titration method.

Suitable catalytically active compounds are molybdenum or tungsten compounds which, without addition of a support, are mainly present as $MoO_3$ or $WO_3$ after prolonged heating at 600° C. in moist air, or mixtures of these compounds. Examples of such compounds are all types of tungstic and molybdic acids, e.g. $WO_3$, $WO_3 \cdot H_2O$, $WO_3 \cdot 2H_2O$, metatungstic and paratungstic acids and the isopolyacids and also the corresponding analogous molybdenum compounds. In this context, mention may also be made of heteropolyacids such as $H_3PW_{12}O_{40}$, $H_4SiW_{12}O_{40}$, $H_4GeW_{12}O_{40}$ and so forth to $H_6P_2W_{18}O_{56}$ or the corresponding molybdenum compounds, and the salts of the abovementioned acids, e.g. ammonium orthotungstate, ammonium metatungstate and ammonium paratungstate, the corresponding molybdenum compounds, and reduced tungsten and molybdenum compounds and also organomolybdenum or organotungsten compounds.

Preference is given to the use of oxygen-containing tungsten compounds or of mixtures of oxygen-containing tungsten compounds with oxygen-containing molybdenum compounds in which the tungsten compounds predominate. Particular preference is given to using catalysts whose catalytically active compounds, apart from the usual impurities, consist virtually only of oxygen-containing tungsten compounds. Particular mention may here be made of $WO_3$, tungstic acid and ammonium paratungstate.

Suitable support materials are oxidic supports such as zirconium dioxide, titanium dioxide, hafnium oxide, yttrium oxide, iron(III) oxide, aluminum oxide, tin(IV) oxide or mixtures of these oxides. Preference is given to using zirconium dioxide or titanium dioxide, with titanium dioxide being particularly preferred and titanium dioxide having a proportion of >65% in the anatase modification being particularly suitable. The support material can be used in freshly precipitated, dried or calcined form. The respective support material can be obtained by hydrolysis of appropriate halides, nitrates, sulfates or alkoxides, e.g. starting from titanium tetraisopropoxide, titanyl chloride, titanyl nitrate, titanium tetrachloride or titanyl sulfate.

For the purposes of the present invention, the figures given for the proportion of catalytically active compounds in the catalyst is based on the trioxides of tungsten and/or molybdenum. The catalysts generally contain from 0.1 to 70% by weight, preferably from 5 to 40% by weight and particularly preferably from 10 to 35% by weight, of the catalytically active compounds, in each case calculated as $MoO_3$ and/or $WO_3$ and based on the total weight of the finished, calcined and dry catalyst.

After application of the oxygen-containing molybdenum and/or tungsten compound, the BET surface area of the finished catalyst does not exceed a maximum specific surface area of $$BET[cat, max] = BET[X]/(1-\text{loss on ignition}[X])\cdot(1-Y).$$

Here, X refers to the oxidic support material and Y to the oxygen-containing molybdenum and/or tungsten compound, each in g. In this calculation, it is assumed that both $H_2O$ and the oxygen-containing molybdenum and/or tungsten compound which has been used occupy the surface of the oxidic support material.

In addition, it is possible to use pore formers such as tartaric acid, oxalic acid, citric acid, ammonium nitrate, ammonium formate, ammonium oxalate, guanidinium salts, urotropin, proteins such as gelatin, polyvinyl alcohol, polyethylene oxide, polymethylene oxide, carbohydrates such as glucose, sucrose and soluble starch, PTHF, surfactants and sulfonic acids. Preference is given to tartaric acid, citric acid and oxalic acid, especially oxalic acid.

With regard to the proportion of pore former present in the catalyst, the content of pore former is, for the purposes of the present invention, given in % by weight based on the finished, calcined and dry catalyst. The sum of the percentages by weight of the compounds present in the catalyst therefore exceeds 100%. According to the present invention, the catalysts contain up to 200% by weight, preferably up to 100% by weight and particularly preferably up to 60% by weight, of pore formers.

In addition, the catalyst may further comprise a sulfur and/or phosphorus compound. Since it is assumed that the sulfur in the catalysts of the present invention is present as sulfate and the phosphorus is present as phosphate, the proportion of these compounds in the catalyst is calculated as sulfate or phosphate, based on the total weight of the finished, calcined and dry catalyst. In this way, the catalysts can contain up to 15% by weight, preferably up to 10% by weight and particularly preferably up to 8% by weight, of sulfate and/or phosphate.

Sources of the corresponding phosphorus and/or sulfur compounds are, for example, sulfuric acid, soluble sulfates such as ammonium sulfate or ammonium hydrogensulfate or the corresponding sulfites or hydrosulfites, phosphoric acid, soluble phosphates such as anmnonium phosphate or the ammonium hydrogen-phosphates or the corresponding phosphites.

As further additive, a binder such as silica sol, clays, boric acid or $AlPO_4$ may also be present in the catalysts.

The present invention also provides a process for preparing a catalyst comprising a catalytically active amount of at least one oxygen-containing molybdenum and/or tungsten compound as an oxidic support material, in which the following steps are carried out:

precipitation of the oxidic support material, thermal treatment of the oxidic support material to set a BET surface area of 135–220 m$^2$/g, application of the catalytically active compound(s) or its/their precursor compound(s) to the support material and calcination of the resulting catalyst at from 400° C. to 900° C. to give the finished catalyst.

It has been found that catalysts having the specified BET surface area can be prepared by the process of the present invention when freshly precipitated oxidic support material, e.g. preferably TiO$_2$*aq, is not used directly as oxidic support material for the catalysts to be prepared, but is firstly subjected to thermal treatment. Freshly precipitated oxidic support material has a high specific surface area. It has been found that such a high specific surface area causes a drop in the acidity and activity of the finished catalyst. If the surface area of the oxidic support material is set in a targeted manner to BET values of 135–220 m$^2$/g, preferably 170–220 m$^2$/g and particularly preferably 190–220 m$^2$/g, by thermal treatment, e.g. by calcination at from about 300° C. to about 550° C., it is possible to prepare catalysts which have a particularly high activity and an acidity at pK$_a$<−3 of at least 70 μmol/g, preferably at least 90 μmol/g, in the dry state. A further advantage is that a uniform support material attains a defined BET surface area. Support materials used are zirconium dioxide or titanium dioxide, preferably titanium dioxide. Since the process of the present invention is preferably employed for preparing the abovementioned catalyst of the present invention, what has been said above applies to the properties of the catalyst prepared in this way, e.g. in respect of the proportion of catalytically active compounds, any pore formers added, added sulfate and/or phosphate.

In a preferred embodiment of the preparative process of the present invention, it is possible to prepare catalysts which have a particularly good mechanical stability. This mechanical stability can be achieved by carrying out the thermal treatment of the freshly precipitated TiO$_2$*aq for the targeted setting of a desired BET surface area under a water-containing or steam-containing atmosphere. In this case, the water-containing or steam-containing atmosphere should comprise more than 10% by volume, preferably more than 20% by volume and particularly preferably more than 30% by volume, of water or steam. The process can also be carried out at a pressure other than atmospheric pressure.

When carrying out the process of the present invention, preference is given to applying the catalytically active compound(s) in a molar ratio of support material to catalytically active compound of 5.0–7.5, preferably 6.0–7.0.

Subsequently, the calcination of the catalyst is preferably carried out stepwise, with the catalyst firstly being calcined at 100–600° C. and then being subjected to final calcination at up to 900° C., preferably up to 700° C., to give the finished catalyst. In the case of calcination with a stepwise increase in the temperature, it is possible, for example, to carry out calcination firstly at a low initial temperature, e.g. 200° C., then to increase the temperature to, for example, 500° C. and subsequently to carry out a final calcination with a further increase in the temperature.

The present invention also provides a process for preparing polytetrahydrofuran, tetrahydrofuran copolymers, diesters or monoesters of these polymers by polymerization of tetrahydrofuran in the presence of at least one telogen and/or comonomer using the abovementioned catalyst in one of its inventive embodiments, with the catalyst having been obtained, for example, by the preparative process likewise claimed in one of its inventive embodiments.

Particular mention may be made of the preparation of polytetrahydrofuran and tetrahydrofuran copolymers and of polytetrahydrofurandicarboxylate, and also, in the preparation of polytetrahydrofuran, the preparation from tetrahydrofuran and 1,4-butanediol or H$_2$O as telogen or using short-chain PTHF.

Polytetrahydrofurandicarboxylate is prepared from THF and carboxylic anhydride, preferably acetic anhydride.

The invention is illustrated by the examples below.

I. Measurement and Determination Methods Used

I.1. Measurement of the BET Surface Area

The BET surface areas were determined by adsorption of N$_2$ in accordance with DIN 66131.

I.2. Measurement of the Tungsten Content 200 mg of the homogenized sample are mixed with about 25 g of borax/lithium fluoride as flux and fused in a platinum crucible at 1000° C. The fused mass is analyzed by X-ray fluorescence. Evaluation is carried out by means of external calibration using matrix-batched reference standards.

I.3. Measurement of the Loss on Ignition of the TiO$_2$ Support

The loss on ignition was calculated as follows from the initial weight (m$_{20}$) and the weight after ignition at 900° C. in air for five hours (m$_{900}$):

$$\text{Loss on ignition } [\text{TiO}_2] = 1 - m_{900}/m_{20}$$

I.4. Measurement of the Hammett Acidity

The number of acid centers having a pK$_a$ of <−3 ("acidity") was determined by titration with pyrazine as base in absolute toluene as solvent using dicinnamalacetone (CAS 622-21-9) as indicator.

The finely milled catalyst is dried overnight at 200° C. under reduced pressure (<1 mbar) and in the absence of light. About 50 ml of absolute toluene and 1 mg of dicinnamalacetone (dissolved in 1 ml of absolute toluene) are then added under argon. The mixture is subsequently titrated while stirring with a 0.1% strength by weight solution of pyrazine in absolute toluene, with the mixture being allowed to equilibrate for at least 5 hours after each addition of pyrazine. The end point of the titration can be recognized by a color change from blue to red, which becomes more distinct if another 1 mg of dicinnamalacetone is added shortly before the end point of the titration. In general terms, the titration was carried out as indicated, for example, in H. Benesi and B. Winquist, Advances in Catalysis, Vol. 27, 1978, Academic Press, ISBN 0-12-007827-9, and the references cited therein.

I.5. Measurement of the Cutting Hardness

The measurement of the cutting hardness was carried out as follows:

A blade having a thickness of 0.3 mm is pressed with increasing force onto each of 25 randomly chosen, visually crack-free extrudates having a mean length of 2–3 times the diameter until the respective extrudate has been cut through. The force required for this is the cutting hardness in N.

I.6. Measurement of the Porosity

The porosity of the catalyst was determined by the Hg intrusion method in accordance with DIN 66133.

I.7. Setting of the BET Surface Area of the TiO$_2$ Support

Precipitated TiO$_2$*aq having a BET surface area of 275 m$^2$/g is calcined in air in a continuously operated rotary tube at from 350 to 500° C. and a residence time of about 1 hour. This gives a uniform material having a defined BET surface area in the range from 135 to 220 m$^2$/g.

II. Starting Compounds

II.1. Titanium Oxides and Hydroxides

Possible titanium oxides and hydroxides which are suitable as support materials for preparing the catalysts of the present invention and were used as desired are ones which are commercially available under the name S 150, S 140 and S 240 from Kemira, under the name P 25 from Degussa, as VKR 611, Hombikat UV100 and Hombifine N from Sachtleben, XT 25376 from Norton, DT 51 from Thann et Mulhouse and Bayoxide TA-DW-1, Bayoxide TA-K-I from Bayer.

II.2. Zirconium Oxides and Hydroxides

Zirconium oxides and hydroxides which may be mentioned as suitable for preparing the catalysts of the present invention are S97/718 from MEL, D9-89 from BASF, XZ 16052 from Norton and HC 15 from SEPR.

II.3. Tungsten and Molybdenum Compounds

As tungsten or molybdenum compounds, use is made of $WO_3$, $MoO_3$, $H_2WO_4$ and ammonium metatungstate and paratungstate from H.C. Starck.

III. General Method of Preparing the Catalyst

III.1a. Impregnation of the Support with the Catalytically Active Compound

To prepare the catalyst, the support is impregnated with the appropriate molybdenum and/or tungsten compound in water. If desired, a soluble pore former, as indicated above by way of example, can also be added to this impregnation solution. In addition, a binder in the form of a powder or in the form of a suspension may be added if desired.

III.1b. Mixing the Support with the Catalytically Active Compound

As an alternative to this impregnation method, the support can also be mixed with the molybdenum and/or tungsten compound and water. This can be carried out, for example, in a pan mill or a kneader. In addition, a pore former which is soluble or insoluble in water and a binder in the form of a powder or a suspension may be added. This method is preferred over impregnation as described under 1a.

III.2. Spraying the Mix Obtained

An intermediate step which can be carried out if desired is spraying the mix obtained in this way, drying and precalcining the sprayed material at from about 80 to 600° C., preferably from 100 to 500° C., in an oxidizing, inert or reducing atmosphere which may in each case be either static or flowing. As oxidizing atmosphere, it is possible to use air or the like; as inert atmosphere, it is possible to use $N_2$, Ar or $CO_2$; as reducing atmosphere, it is possible to use organic compounds in inert gas, CO or $H_2$.

III.3. Pan Milling or Kneading the Material

As the next step in the preparation, the catalyst is pan milled or kneaded, with in each case a pore former which is soluble or insoluble in water and a binder being again able to be added if desired.

III.4. Shaping the Catalyst

The catalyst is subsequently shaped by, for example, extrusion or tableting to give shaped bodies such as cylinders, spheres, rings, spirals, rods or granules.

III.5. Precalcination

If desired, a precalcination at from about 80 to 600° C., preferably from 100 to 500° C., under an oxidizing, inert or reducing atmosphere which may in each case be either static or flowing can now be carried out.

III.6. Final Calcination

The final calcination is subsequently carried out at from 400 to 900° C., preferably from 550 to 850° C. and particularly preferably from 600 to 800° C., again under an oxidizing, inert or reducing atmosphere which may in each case be either static or flowing and using a gas as described by way of example under 2. Calcination at from 600 to 800° C. produces a catalyst which gives a particularly high space-time yield.

Exhausted catalysts which have been regenerated by customary methods, e.g. by treatment with solvents, steam or calcination at from 300° C. to 600° C. for from 0.1 to 10 hours in air, $CO_2$ or a reducing atmosphere such as $H_2$ or CO, can also be used. Furthermore, it is possible to reuse catalyst powders, shaped bodies and/or granulated catalyst by addition to the above-described preparation steps.

If desired, this final calcination can be followed by targeted reduction, as has been described in DE-A-196 41 481.

The preparation of the catalyst is essentially carried out by methods analogous to those described in DE-A-44 33 606 or DE-A-196 49 803, which are hereby expressly incorporated by reference.

IV. Preparation of PTHF

Since the activities of each of the catalysts according to the present invention were tested in the preparation of PTHF, this preparative process will not be discussed at this point but the basic process variants used will be presented.

IV.1. General

It is in principle possible to use any THF as monomer for preparing PTHF. However, preference is given to using commercial THF which has been prepurified by acid treatment as described, for example, in EP-A 003 112 or by distillation.

Suitable telogens in the single-stage process are saturated or unsaturated, unbranched or branched alpha,omega-$C_2$–$C_{12}$-diols, water, polytetrahydrofuran having a molecular weight of from 200 to 700 dalton, cyclic ethers or mixtures thereof. Preference is given to water, ethylene glycol, 1,3-propanediol, 1,4-butanediol, 1,5-pentanediol, 1,6-hexanediol, polytetrahydrofuran having a molecular weight of from 200 to 700 dalton, 1,6-hexanediol, 1,8-octanediol, 1,10-decanediol, 2-butyne-1,4-diol and neopentyl glycol or mixtures thereof, with particular preference being given to water, 1,4-butanediol and/or polytetrahydrofuran having a molecular weight of from 200 to 700 dalton.

Telogens used for preparing PTHF and THF copolymers by the two-stage process are carboxylic anhydrides and/or carboxylic anhydride/protic acid mixtures. Preference is given to carboxylic anhydrides which are derived from aliphatic or aromatic polycarboxylic and/or monocarboxylic acids and contain from 2 to 12, preferably from 1 to 8, carbon atoms. Particular preference is given to acetic anhydride. The protic acids are preferably organic and inorganic acids which are soluble in the reaction system. Preferred carboxylic acids are aliphatic or aromatic polycarboxylic and/or monocarboxylic acids which contain from 2 to 12, preferably from 1 to 8, carbon atoms. Examples of aliphatic carboxylic acids are acetic acid, lactic acid, propionic acid, valeric acid, caproic acid, caprylic acid and pelargonic acid. Examples of aromatic carboxylic acids are phthalic acid and naphthalenecarboxylic acid. Among these carboxylic acids, preference is given to using acetic acid.

Suitable comonomers are cyclic ethers which can be polymerized in a ring-opening polymerization, preferably three-, four- and five-membered rings such as the THF derivatives 2-methyltetrahydrofuran or 3-methyltetrahydrofuran, cyclic ethers such as 1,3-dioxolane, trioxane, oxetane, substituted oxetanes such as 3,3-dimethyloxetane, 1,2-alkylene oxides, for example ethylene oxide or propylene oxide, with particular preference being given to 2-methyltetrahydrofuran or 3-methyltetrahydrofuran.

The telogen is advantageously introduced into the polymerization as a solution in THF; preference is given to a telogen content of from 0.04 to 17 mol %, based on tetrahydrofuran. Comonomers are likewise advantageously introduced into the polymerization as a solution in THF; the comonomer content can be up to 30 mol %, preferably 20 mol %, based on tetrahydrofuran. However, it is also possible to introduce THF and the telogen and/or the comonomer separately into the polymerization reactor. Since the telogen effects termination of the polymerization, the mean molecular weight of the PTHF or THF copolymer can be controlled via the amount of telogen used. The more telogen present in the reaction mixture, the lower the mean molecular weight of the PTHF or the THF copolymers concerned. Depending on the telogen content of the polymerization mixture, it is possible to prepare PTHF and THF copolymers having mean molecular weights of from 650 to 5000 dalton, preferably from 650 to 3000 dalton and particularly preferably from 1000 to 3000 dalton.

The polymerization is generally carried out at from 0 to 80° C., preferably from 25 to 75° C. and particularly preferably from 40 to 70° C. The pressure employed is generally not critical to the result of the polymerization, which is why the polymerization is generally carried out at atmospheric pressure or under the autogenous pressure of the polymerization system.

To avoid formation of ether peroxides, the polymerization is advantageously brought about under an inert gas atmosphere. Inert gases which can be used are, for example, nitrogen, carbon dioxide or the noble gases; preference is given to using nitrogen.

The polymerization can be carried out in the presence of hydrogen at hydrogen pressures of from 0.1 to 10 bar.

The process of the present invention is preferably operated continuously. However, the polymerization step and/or one or more or all of the work-up steps of the process of the present invention can also be operated batchwise, but in this case it is preferred for at least the polymerization to be carried out continuously.

The reaction is preferably carried out in conventional reactors or reactor assemblies suitable for continuous processes in a suspension or fixed-bed mode, in the case of a suspension mode, for example, in loop reactors or stirred reactors or in the case of a fixed-bed mode in tube reactors or fixed-bed reactors. The fixed-bed mode is preferred.

In the fixed-bed mode, the polymerization reactor can be operated in the upflow mode, i.e. the reaction mixture is conveyed from the bottom upward, or in the downflow mode, i.e. the reaction mixture is passed through the reactor from the top downward. The starting material mixture (feed) of THF and telogen and/or comonomer is fed continuously to the polymerization reactor and the WLSV is from 0.05 to 0.8 kg of THF/(1 h), preferably from 0.1 to 0.6 kg of THF/(1 h) and particularly preferably from 0.15 to 0.5 kg of THF/(1 h).

Furthermore, the polymerization reactor can be operated in the single-pass mode, i.e. without product recirculation, or in the recycle mode, i.e. the polymerization mixture leaving the reactor is circulated. In the recycle mode, the ratio of recycle to fresh feed is ≦100:1, preferably <40:1 and particularly preferably <30:1.

IV.2. Continuous THF Polymerization: Variant A 150 g of catalyst were installed in a fixed-bed reactor without recirculation and were subsequently dried at 200° C. in a stream of $N_2$ for 24 hours. The reactor was then cooled to 60° C. and started up at a throughput of 45 g/h of a mixture comprising 4000 ppm of 1,4-butanediol in THF (tetrahydrofuran). The output was collected daily and freed of THF and butanediol by heating under reduced pressure (0.3 mbar, 120° C.). The number average molecular weight of the PTHF obtained in this way was then measured.

The butanediol content of the feed was subsequently varied until the mean molecular weight of the PTHF $M_n$ was 2000±200 on three successive days. The THF conversion was averaged over these three days.

IV.3. Continuous THF Polymerization: Variant B 200 g of catalyst were installed in a fixed-bed reactor without recirculation and were subsequently dried at 200° C. in a stream of $N_2$ for 24 hours. The reactor was then cooled to 60° C. and started up at a throughput of 50 g/h of a mixture comprising 4000 ppm of 1,4-butanediol in THF. The output was collected daily and freed of THF and butanediol by heating under reduced pressure (0.3 mbar, 120° C.). The number average molecular weight of the PTHF obtained in this way was then measured. The butanediol content of the feed was subsequently varied until the mean molecular weight of the PTHF was 2000±200 on three successive days. The THF conversion was averaged over these three days.

IV.4. Batchwise THF Polymerization

The batchwise polymerization experiments were carried out under an argon atmosphere in 40 ml GC sample bottles. 5 g of catalyst extrudates which had been dried at 400° C. in a stream of $O_2/N_2$ ("synthetic air") for 18 hours to remove adsorbed water before use were heated at 60° C. in 20.75 g of butanediol-containing THF (butanediol concentration: 2000 ppm) under Ar for 6 hours while shaking. The reaction vessel was subsequently cooled and the catalyst was filtered off and washed three times with 10 g each time of THF. The filtrates were combined, evaporated at 70° C./20 mbar on a rotary evaporator and weighed.

IV.5. Measurement of the Molecular Weight of the PTHF

The molecular weight is determined by measurement of the hydroxyl number of polytetrahydrofuran. For the purposes of the present invention, the hydroxyl number is the amount of potassium hydroxide in mg which is equivalent to the amount of acetic acid bound in the acetylation of 1 g of a substance. The hydroxyl number is determined by esterification of the hydroxyl groups present with an excess of acetic anhydride.

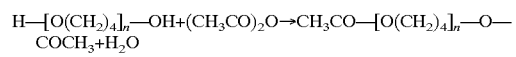

After the reaction, the excess acetic anhydride is hydrolyzed with water according to the following reaction equation

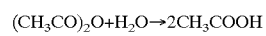

and back-titrated as acetic acid using sodium hydroxide.

Catalysts

EXAMPLES

I. Examples of the Setting of a Transport Pore Size of >25 nm and a Pore Volume of at Least 50 mm³/g in the Finished Catalysts Comparative Example 1

130 kg of $TiO_2$*aq (=100 kg of $TiO_2$) and 26.7 kg of tungstic acid (=25 kg of $WO_3$) were compounded in a pan mill with 1.52 kg of $H_3PO_4$ (85%) and 46.7 kg of $H_2O$, and the resulting paste was extruded and shaped to form extrudates having a diameter of 4 mm. These were dried at 170° C. and subsequently calcined at 690° C. for 2 hours.

Example 1

119 kg of $TiO_2$*aq (=95.6 kg of $TiO_2$) and 25.6 kg of tungstic acid (=23.9 kg of $WO_3$) were compounded in a pan mill with 1.46 kg of $H_3PO_4$ (85%) and 48 kg of $H_2O$, and the resulting paste was extruded and shaped to form extrudates having a diameter of 4 mm. These were dried at 170° C. and subsequently calcined at 690° C. for 2 hours.

Example 2

150.2 g of $TiO_2$*aq (=115.7 g of $TiO_2$) and 40.46 g of tungstic acid (=37.63 g of $WO_3$) were kneaded with 94 g of stearic acid, 9.4 g of tartaric acid, 2.2 g of $H_3PO_4$ (85%) and 92 g of $H_2O$ in a laboratory kneader, and the resulting paste was shaped to form extrudates having a diameter of 4 mm. These were dried at 400° C. in a stream of $N_2$ for 4 hours and subsequently calcined at 650° C. in air for 3 hours.

Example 3

200 g of $TiO_2$*aq (=160 g of $TiO_2$) and 43 g of tungstic acid (=40 g of $WO_3$) were kneaded with 48.6 g of stearic acid, 12.2 g of tartaric acid, 38.6 g of aqueous silica sol (15.8% $SiO_2$) and 40 g of $H_2O$ in a laboratory kneader, and the resulting paste was shaped to form extrudates having a diameter of 4 mm. These were subsequently dried at 350° C. in air for 2 hours and calcined at 700° C. in air for 3 hours.

Example 4

128.7 g of $TiO_2$*aq (=99 g of $TiO_2$), 35.4 g of tungstic acid (=33 g of $WO_3$), 65.9 g of oxalic acid, 6.9 g of methylcellulose and 70 g of $H_2O$ were kneaded in a laboratory kneader, and the resulting paste was shaped to form extrudates having a diameter of 4 mm. These were subsequently calcined at 650° C. in air for 2 hours.

Example 4a 100 g of $TiO_2$*aq (=80 g of $TiO_2$), 31.3 g of ammonium paratungstate (=28.2 g of $WO_3$), 91.9 g of oxalic acid, 4 g of polyvinyl alcohol, 4 g of polyethylene oxide and 80 g of $H_2O$ were kneaded in a laboratory kneader, and the resulting paste was shaped to form extrudates having a diameter of 4 mm. These were subsequently calcined at 650° C. in air for 1.5 hours.

Example 5

143.2 g of $TiO_2$*aq (=110 g of $TiO_2$), 29.6 g of tungstic acid (=27.5 g of $WO_3$), 68.7 g of stearic acid, 6.9 g of tartaric acid, 60.8 g of guanidinium carbonate, 1.6 g of $H_3PO_4$ (85%) and 80 g of $H_2O$ were kneaded in a laboratory kneader, and the resulting paste was shaped to form extrudates having a diameter of 4 mm. These were dried at 400° C. in a stream of $N_2$ for 4 hours and subsequently calcined at 650° C. in air for 3 hours.

Example 6

217.5 g of $TiO_2$*aq (=167.6 g of $TiO_2$), 44.9 g of tungstic acid (=41.8 g of $WO_3$), 104.4 g of ammonium citrate, 10.4 g of tartaric acid, 2.5 g of $H_3PO_4$ (85%) and 41.5 g of 25% strength $NH_3$ solution were kneaded in a laboratory kneader, and the resulting paste was shaped to form extrudates having a diameter of 4 mm. These were calcined at 650° C. in air for 3 hours.

Example 7

143 g of $TiO_2$*aq (=110 g of $TiO_2$), 29.6 g of tungstic acid (=27.5 g of $WO_3$), 68.7 g of guanidinium carbonate, 35 g of formic acid, 6.9 g of tartaric acid, 1.6 g of $H_3PO_4$ (85%) and 15 g of $H_2O$ were kneaded in a laboratory kneader, and the resulting paste was shaped to form extrudates having a diameter of 4 mm. These were calcined at 650° C. in air for 3 hours.

Example 8

150 g of $TiO_2$*aq (=115.7 g of $TiO_2$) and 40.46 g of tungstic acid (=37.63 g of $WO_3$) were kneaded with 94 g of gelatin, 9.4 g of tartaric acid, 2.2 g of $H_3PO_4$ (85%) and 117 g of $H_2O$ in a laboratory kneader, and the resulting paste was shaped to form extrudates having a diameter of 4 mm. These were subsequently calcined at 700° C. in air for 3 hours.

Example 9

150.2 g of $TiO_2$*aq (=115.7 g of $TiO_2$) and 40.46 g of tungstic acid (=37.63 g of $WO_3$) were kneaded with 94 g of pure, soluble starch, 9.4 g of tartaric acid, 2.2 g of $H_3PO_4$ (85%) and 140 g of $H_2O$ in a laboratory kneader, and the resulting paste was shaped to form extrudates having a diameter of 4 mm. These were subsequently calcined at 700° C. in air for 3 hours.

Example 10

150.2 g of $TiO_2$*aq (=115.7 g of $TiO_2$) and 40.46 g of tungstic acid (=37.63 g of $WO_3$) were kneaded with 93.9 g of cold-milled paraffin, 9.4 g of tartaric acid, 2.2 g of $H_3PO_4$ (85%) and 100 g of $H_2O$ in a laboratory kneader, and the resulting paste was shaped to form extrudates having a diameter of 4 mm. These were subsequently dried at 400° C. in a stream of $N_2$ for 4 hours and calcined at 700° C. in air for 3 hours.

Example 11

160 g of $TiO_2$*aq (=128 g of $TiO_2$) and 34.4 g of tungstic acid (=32 g of $WO_3$) were kneaded with 77.8 g of carbon black (Printex 75, from Degussa), 9.8 g of tartaric acid, 2.3 g of $H_3PO_4$ (85%), 20.4 g of alkali-free Lutensol and 120 g of $H_2O$ in a laboratory kneader, and the resulting paste was shaped to form extrudates having a diameter of 4 mm. These were subsequently dried at 400° C. in a stream of $N_2$ for 4 hours and calcined at 600° C. in air for 8 hours.

Example 12

200 g of $TiO_2$*aq (=160 g of $TiO_2$) and 41.4 g of $H_3PW_{12}O_{40}$*aq (=33.2 g of $WO_3$) were stirred with 520 g of $H_2O$ in a glass beaker and evaporated at 60° C. under reduced pressure. The material was subsequently heated to 500° C. in a stream of $N_2$ and calcined at this temperature in air for 2 hours. The product was finely milled in an analytical mill, kneaded with 120.8 g of $H_2O$ in a laboratory kneader, and the resulting paste was shaped to form extrudates having a diameter of 4 mm. These were subsequently calcined at 700° C. in air for 3 hours.

Example 13

375 g of $TiO_2$*aq (=300 g of $TiO_2$) and 103.4 g of $H_3PW_{12}O_{40}$*aq (=82.9 g of $WO_3$) were stirred with 1040 g of $H_2O$ in a glass beaker and evaporated at 60° C. under reduced pressure. The material was subsequently heated to 500° C. in a stream of $N_2$ and calcined at this temperature in air for 2 hours. The product was milled in a spiral jet mill at 8 bar to give particles having a mean size of 0.8 μM, kneaded with 120.8 g of $H_2O$ in a laboratory kneader, and the resulting paste was shaped to form extrudates having a diameter of 4 mm. These were subsequently calcined at 650° C. in air for 1 hour.

Example 14

8.38 kg of $TiO_2$*aq (=6.44 kg of $TiO_2$) and 2.00 kg of $H_3PW_{12}O_{40}$*aq (=1.61 kg of $WO_3$) were slurried with 138 kg of $H_2O$ and sprayed in a spray dryer at 120° C. to give a powder having a mean particle size of 2.7 μm, and this powder was subsequently calcined at 500° C. for 2 hours. 200 g of this spray-dried powder were kneaded with 10 g of methylcellulose and 120 g of $H_2O$ in a laboratory kneader, and the resulting paste was shaped to form extrudates having a diameter of 4 mm. These were subsequently calcined at 700° C. in air for 3 hours.

Comparison of the catalysts from Comparative Example 1 and Examples 1 to 16 when used in the polymerization of THF is shown in Table 1. In this comparison, THF was polymerized batchwise, as described above under IV.4.

The experiments show that the use of catalysts having a high proportion of transport pores of >25 nm in the process of the present invention in all cases leads to an increase in activity. When using the process of the present invention, the capacity of existing plants for the preparation of PTHF can therefore be increased significantly without plant modification or future plants can be made correspondingly smaller and therefore be built at a correspondingly reduced capital cost.

TABLE 1

Comparison of the catalysts from the examples

| Method of obtaining the porosity | Cat. | $WO_3$ content of the batch [% by weight] | BET [m²/g] | Acidity at $PK_a$ < −3 [μmol/g] | Volume of pores > 25 nm [cm³/g] | STY [$g_{(PTHF)}/kg_{(cat)}$*h] |
|---|---|---|---|---|---|---|
| "Dry"-shaped | CE1 | 20 | 79 | 28 | 0.020 | 18 |
| "Wet"-shaped | E1 | 20 | 76 | 36 | 0.146 | 33 |
| Pore former | | | | | | |
| Stearic acid | E2 | 24.5 | 93 | 45 | 0.754 | 104 |
| Stearic acid | E3 | 20 | 71 | 25 | 0.311 | 69 |
| Oxalic acid | E4 | 25 | 74 | 27 | 0.376 | 86 |
| Oxalic acid | E4a | 26 | 73 | 48 | 0.365 | 140 |
| Carbonates | E5 | 20 | 65 | 37 | 0.779 | 79 |
| Ammonium salts | E6 | 20 | 71 | 19 | 0.153 | 51 |
| Guanidinium salts | E7 | 20 | 63 | 22 | 0.054 | 26 |
| Proteins | E8 | 24.5 | 91 | 37 | 0.624 | 84 |
| Carbohydrates | E9 | 24.5 | 107 | 42 | 0.106 | 66 |
| Paraffin | E10 | 24.5 | 73 | 37 | 0.440 | 92 |
| Carbon black | E11 | 25 | 75 | 30 | 0.477 | 70 |
| Milling + shaping | E12 | 18 | 59 | 22 | 0.438 | 54 |
| | E13 | 21 | 67 | 19 | 0.248 | 65 |
| Spraying + shaping | E14 | 20 | 65 | 19 | 0.481 | 41 |
| | E15 | 25 | 79 | 30 | 0.435 | 45 |
| | E16 | 25 | 78 | 34 | 0.397 | 69 |

Example 15

7.86 kg of $TiO_2$*aq (=6.04 kg of $TiO_2$) and 2.50 kg of $H_3PW_{12}O_{40}$*aq (=2.01 kg of $WO_3$) were slurried with 138 kg of $H_2O$ and sprayed in a spray dryer at 120° C. to give a powder having a mean particle size of 2.6 μm, and this powder was subsequently calcined at 500° C. for 2 hours. 200 g of this spray-dried powder were kneaded with 10 g of methylcellulose and 120 g of $H_2O$ in a laboratory kneader, and the resulting paste was shaped to form extrudates having a diameter of 4 mm. These were subsequently calcined at 650° C. in air for 3 hours.

Example 16

7.86 kg of $TiO_2$*aq (=6.04 kg of $TiO_2$) and 2.50 kg of $H_3PW_{12}O_{40}$*aq (=2.01 kg of $WO_3$) were slurried with 138 kg of $H_2O$ and sprayed in a spray dryer at 120° C. to give a powder having a mean particle size of 2.6 μm, and this powder was subsequently calcined at 500° C. for 2 hours. 200 g of this spray-dried powder were kneaded with 6 g of polyethylene oxide and 116 g of $H_2O$ in a laboratory kneader, and the resulting paste was shaped to form extrudates having a diameter of 4 mm. These were subsequently calcined at 650° C. in air for 2 hours.

II. Examples of the Setting of a Tungsten Content of from >10.1 to <20.9 μmol/m²

Comparative Example II.1

100 g of $TiO_2$*aq (=78 g of $TiO_2$), 15.5 g of ammonium paratungstate (=13.8 g of $WO_3$) and 80.9 g of anhydrous oxalic acid were compounded in a laboratory kneader with 75 g of $H_2O$, and the resulting mass was extruded and shaped to form extrudates having a diameter of 4 mm. These were calcined at 200° C. for 2 hours, at 500° C. for 3 hours and at 600° C. for 3 hours.

Comparative Example II.2

184.7 g of $TiO_2$*aq (=144 g of $TiO_2$), 29 g of tungstic acid (=27 g of $WO_3$) and 67 g of $H_2O$ were compounded in a laboratory kneader, and the resulting mass was extruded and shaped to form extrudates having a diameter of 4 mm. These were dried at 105° C. and subsequently calcined at 775° C. for 24 hours.

Comparative Example II.3

123.1 kg of $TiO_2$*aq (=96 g of $TiO_2$), 25.7 kg of tungstic acid (=24 kg of $WO_3$) and 6.09 kg of tartaric acid were compounded in a pan mill with 2.95 kg of aqueous $H_3PO_4$ (=1.764 kg of $P_2O_5$) and 45 kg of $H_2O$, and the resulting mass was extruded and shaped to form extrudates having a diameter of 4 mm. These were dried at 105° C. and subsequently calcined at 690° C. for 2 hours.

Comparative Example II.4

180 g of TiO$_2$*aq (=144.4 g of TiO$_2$), 38.7 g of tungstic acid (=36.1 g of WO$_3$) and 9.02 g of tartaric acid were compounded in a laboratory kneader with 2.21 g of aqueous H$_3$PO$_4$ (=1.32 g of P$_2$O$_5$) and 73 ml of H$_2$O, and the resulting mass was extruded and shaped to form extrudates having a diameter of 4 mm. These were dried at 105° C. and subsequently calcined at 690° C. for 48 hours.

Comparative Example II.5

180 g of TiO$_2$*aq (=140 g of TiO$_2$), 69.9 g of ammonium paratungstate (=62.2 g of WO$_3$) and 37.5 g of anhydrous oxalic acid were compounded in a laboratory kneader with 53 g of H$_2$O, and the resulting mass was extruded and shaped to form extrudates having a diameter of 4 mm. These were dried at 35° C. and subsequently calcined at 200° C. for 2 hours and at 500° C. for 3 hours.

Comparative Example II.6

125 g of TiO$_2$*aq (=97.5 g of TiO$_2$), 48.5 g of ammonium paratungstate (=43.2 g of WO$_3$) and 43.4 g of anhydrous oxalic acid were compounded in a laboratory kneader with 56 g of H$_2$O, and the resulting mass was extruded and shaped to form extrudates having a diameter of 4 mm. These were dried at 40° C. and subsequently calcined at 200° C. for 2 hours, at 500° C. for 7 hours and at 670° C. for 3 hours.

Comparative Example II.7

66.6 kg of TiO$_2$*aq (=51.5 kg of TiO$_2$), 31.1 kg of ammonium paratungstate (=27.7 g of WO$_3$) were compounded in a pan mill with 20.4 kg of oxalic acid dihydrate and 15 kg of H$_2$O, and the resulting mass was extruded and shaped to form extrudates having a diameter of 4 mm. These were dried at 90° C. and subsequently calcined at 200° C. for 2 hours, at 500° C. for 3 hours and at 510° C. for 3 hours.

Comparative Example II.8

The catalyst from Example 7 was additionally calcined at 690° C. for 12 hours.

Example II.1

184.7 g of TiO$_2$*aq (=144 g of TiO$_2$), 29 g of tungstic acid (=27 g of WO$_3$) and 67 g of H$_2$O were compounded in a laboratory kneader, and the resulting mass was extruded and shaped to form extrudates having a diameter of 4 mm. These were dried at 105° C. and subsequently calcined at 675° C. for 16 hours.

Example II.2

119.1 kg of TiO$_2$*aq (=95.6 kg of TiO$_2$), 25.6 kg of tungstic acid (=23.9 kg of WO$_3$) and 5.97 kg of tartaric acid were compounded in a pan mill with 1.46 kg of aqueous H$_3$PO$_4$ (=0.872 kg of P$_2$O$_5$) and 48 kg of H$_2$O, and the resulting mass was extruded and shaped to form extrudates having a diameter of 4 mm. These were dried at 105° C. and subsequently calcined at 690° C. for 2 hours.

Example II.3

119.1 kg of TiO$_2$*aq (=95.6 kg of TiO$_2$), 25.6 kg of tungstic acid (=23.9 kg of WO$_3$) and 5.97 kg of tartaric acid were compounded in a pan mill with 1.46 kg of aqueous H$_3$PO$_4$ (=0.872 kg of P$_2$O$_5$) and 48 kg of H$_2$O, and the resulting mass was extruded and shaped to form extrudates having a diameter of 4 mm. These were dried at 120° C. and subsequently calcined at 400° C. for 2 hours and at 750° C. for 3 hours.

Example II.4

180 g of TiO$_2$*aq (=140 g of TiO$_2$), 71.7 g of ammonium paratungstate (=63.8 g of WO$_3$) and 37.8 g of anhydrous oxalic acid were compounded in a laboratory kneader with 48 g of H$_2$O, and the resulting mass was extruded and shaped to form extrudates having a diameter of 4 mm. These were dried at 90° C. for 2 hours and subsequently calcined at 200° C. for 2 hours, at 500° C. for 5 hours and at 650° C. for 3 hours.

Example II.5

180 g of TiO$_2$*aq (=140 g of TiO$_2$), 71.7 g of ammonium paratungstate (=63.8 g of WO$_3$) and 37.8 g of anhydrous oxalic acid were compounded in a laboratory kneader with 48 g of H$_2$O, and the resulting mass was extruded and shaped to form extrudates having a diameter of 4 mm. These were dried at 35° C. and subsequently calcined at 200° C. for 2 hours, at 500° C. for 5 hours and at 620° C. for 3 hours.

Example II.6

66.6 kg of TiO$_2$*aq (=51.5 kg of TiO$_2$) and 31.1 kg of ammonium paratungstate (=27.7 kg of WO$_3$) were compounded in a pan mill with 20.4 kg of oxalic acid dihydrate and 15 kg of H$_2$O, and the resulting mass was extruded and shaped to form extrudates having a diameter of 4 mm. These were dried at 90° C. and subsequently calcined at 200° C. for 2 hours, at 500° C. for 3 hours and at 610° C. for 3 hours.

The catalysts prepared in this way were used in the continuous THF polymerization described as variant B under IV.3. above. The results achieved are listed in Table 2, whose last column reports the THF conversion in percent.

TABLE 2

Comparison of the catalysts from the examples

| Catalyst | W [g/100 g] | BET | W [μmol/m$^2$] | Conversion |
|---|---|---|---|---|
| Comparative Example II.1 | 11.5 | 75 | 8.3 | 3.2% |
| Example II.1 | 11.2 | 54 | 11.3 | 4.4% |
| Comparative Example II.2 | 11.4 | 29.5 | 21.0 | 2.2% |
| Comparative Example II.3 | 15.2 | 86.4 | 9.6 | 3.0% |
| Example II.2 | 15.8 | 75.5 | 11.2 | 4.7% |
| Example II.3 | 15.6 | 47.2 | 18.0 | 4.1% |
| Comparative Example II.4 | 15.9 | 39.6 | 21.8 | 3.4% |
| Comparative Example II.5 | 24.0 | 172 | 7.6 | 3.6% |
| Example II.4 | 24.7 | 95 | 14.1 | 5.4% |
| Example II.5 | 24.3 | 84.5 | 15.6 | 5.7% |
| Comparative Example II.6 | 23.9 | 59.7 | 21.8 | 4.6% |
| Comparative Example II.7 | 27.8 | 151 | 10.0 | 4.1% |
| Example II.6 | 27.2 | 109 | 13.6 | 5.7% |
| Comparative Example II.8 | 27.8 | 68 | 22.2 | 4.2% |

III. Examples of the Setting of a Defined BET Surface Area of the Oxidic Support Material Example III.1

Preparation of the Catalyst Variant 1

720 g of precalcined TiO$_2$*aq having, in each case, the BET surface area indicated in Table 1, ammonium paratungstate in an amount corresponding to a molar ratio of Ti to W of 6.77 and 156.4 g of anhydrous oxalic acid were compounded in a laboratory kneader with an appropriate amount of $H_2O$, and the resulting mass was extruded and shaped to form extrudates having a diameter of 4 mm. The amount of water required depends on the type of kneader used and on the $TiO_2$ material; it has no influence on activity and acidity. It is typically from 240 to 340 g. The kneaded composition was dried overnight at 35° C. and subsequently calcined stepwise at 200° C. for 2 hours and at 500° C. for another 3 hours in a stream of air. It was then finally calcined for one hour at the temperature indicated in Table 3 to give the finished catalyst. Table 3 reports the loss on ignition of the $TiO_2$*aq determined in each case, the temperatures used for final calcination to give the finished catalyst, the maximum BET surface area and the BET surface area of the catalysts obtained in this way together with the calculated BET drop, the acidity at $pK_a$ <−3 and the conversion in the polymerization of PTHF. It can clearly be seen from the values reported in Table 3 that the reduced surface area of the thermally pretreated $TiO_2$*aq is less susceptible to further sintering and leads to $WO_3/TiO_2$-based catalysts which have a significantly increased number of centers having a $pK_a$ of <−3. Maximum acidities and activities for acid catalysis are obtained, in particular, at a BET surface area of the treated $TiO_2$*aq support in the region of 200 $m^2/g$. The PTHF polymerization was carried out by the continuous process described as Variant A under IV.2. above.

and 290 g of $H_2O$ and shaped to form extrudates having a diameter of 4 mm. These were subsequently calcined stepwise at 200° C. for 2 hours and 500° C. for 3 hours and finally calcined at 575° C. for one hour to give the finished catalyst.

The catalyst extrudates had a mean cutting hardness of 34 N and gave a conversion of 5.2% in the continuous THF polymerization test.

Example III.2

Preparation of the Catalyst Under an Atmosphere Comprising Water Vapor Variant 2b 1.2 kg of freshly precipitated $TiO_2$*aq which had been dried at 100° C. (78% $TiO_2$) were precalcined at 400° C. and a residence time of 20 minutes in a continuously operated rotary tube having an internal diameter of 4 cm over a period of 5 hours. 400 standard liters of air per hour were passed through the rotary tube. In addition, 60 ml per hour of liquid $H_2O$ were metered into the stream of air. This resulted in a material having a BET surface area of 195 $m^2/g$ and a loss on ignition of 8%. 216 g of this material were subsequently kneaded with 96.6 g of ammonium paratungstate (88% $WO_3$), 46.8 of oxalic acid and 80 g of $H_2O$ and shaped to form extrudates having a diameter of 4 mm. These were subsequently calcined stepwise at 200° C. for 2 hours and 500° C. for 3 hours and finally calcined at 575° C. for 1 hour.

The catalyst extrudates had a mean cutting hardness of 20 N and gave a conversion of 6.0% in the continuous THF polymerization test.

TABLE 3

Comparison of the catalysts

| Precalcination of the precipitated $TiO_2$*aq [° C.] | BET of the $TiO_2$*aq after precalcination [$m^2/g$] | Loss on ignition of the $TiO_2$*aq after precalcination | Temperature of the final calcination [° C.] | Max. BET of the catalyst [$m^2/g$] | BET of the catalyst [$m^2/g$] | BET drop [1-BET/BET (max)] | Acidity at $pK_a$ < −3 [μmol/g] | Conversion in the THF polymerization $M_n$(pTHF) = 2000 |
|---|---|---|---|---|---|---|---|---|
| 500 | 142 | 9% | 550 | 109 | 91 | 17% | 95 | |
| 500 | 142 | 9% | 575 | 109 | 97 | 11% | 96 | |
| 500 | 142 | 9% | 600 | 109 | 92 | 16% | 100 | |
| 500 | 142 | 9% | 630 | 109 | 87 | 20% | 95 | 5.3% |
| 430 | 195 | 9% | 550 | 150 | 99 | 34% | 95 | |
| 430 | 195 | 9% | 575 | 150 | 121 | 19% | 104 | 7.0% |
| 430 | 195 | 9% | 600 | 150 | 108 | 28% | 104 | |
| 430 | 195 | 9% | 630 | 150 | 86 | 43% | 97 | 6.3% |
| 410 | 214 | 9% | 550 | 165 | 120 | 27% | 87 | |
| 410 | 214 | 9% | 575 | 165 | 116 | 30% | 98 | 7.7% |
| 410 | 214 | 9% | 600 | 165 | 95 | 42% | 95 | |
| 410 | 214 | 9% | 630 | 165 | 96 | 42% | 88 | |
| 390 | 225 | 9% | 550 | 173 | 118 | 32% | 85 | 3.7% |
| 390 | 225 | 9% | 575 | 173 | 105 | 39% | 89 | |
| 390 | 225 | 9% | 600 | 173 | 138 | 20% | 90 | 3.0% |
| 390 | 225 | 9% | 630 | 173 | 104 | 40% | 88 | |
| 200 | 275 | 10% | 550 | 214 | 114 | 47% | 59 | 3.0% |
| 200 | 275 | 10% | 575 | 214 | 112 | 48% | 59 | |
| 200 | 275 | 10% | 600 | 214 | 97 | 55% | 72 | |
| 200 | 275 | 10% | 630 | 214 | 100 | 53% | 70 | 4.3% |

Example III.2

Preparation of the Catalyst Under an Atmosphere Comprising Water Vapor Variant 2a 2 kg of freshly precipitated $TiO_2$*aq which had been dried at 100° C. (78% $TiO_2$) were calcined at 400° C. in a rotary tube through which air was not passed, i.e. under the water vapor atmosphere given off from the $TiO_2$*aq, for 3 hours in a batch mode. This resulted in a material having a BET surface area of 143 $m^2/g$ and a loss on ignition of 9%. 720 g of this material were subsequently kneaded with 322 g of ammonium paratungstate (88% $WO_3$), 156 g of oxalic acid The following comparative experiments demonstrate the influence of the addition of water during the precalcination of the support material on the cutting hardness and also demonstrate the influence of the precalcination as such on the activity of the finished catalyst.

Comparative Example III.1

To Examine the Cutting Hardness 1.2 kg of freshly precipitated $TiO_2$*aq which had been dried at 100° C. (78% $TiO_2$) was precalcined as above, but no $H_2O$ was metered into the rotary tube. This resulted in a material having a BET surface area of 211 m²/g and a loss on ignition of 9%. 720 g of this material were subsequently kneaded with 322 g of ammonium paratungstate (88% WO₃), 156 g of oxalic acid and 350 g of H₂O and shaped to form extrudates having a diameter of 4 mm. These were subsequently calcined stepwise at 200° C. for 2 hours and at 500° C. for 3 hours and finally calcined at 575° C. for one hour.

The catalyst extrudates had a mean cutting hardness of 8 N and gave a conversion of 7.5% in the continuous THF polymerization test.

In this comparative example, the support material $TiO_2$*aq was prepared according to the present invention, but was precalcined according to Variant 1 without addition of water. The catalysts prepared using this support were found to be mechanically unstable compared to the catalysts prepared according to the Variants 2a and 2b.

Comparative Example III.2

To Examine the Catalyst Activity 750 g of freshly precipitated $TiO_2$*aq which had been dried at 100° C. (78% $TiO_2$) were kneaded with 230 g of ammonium paratungstate (88% WO₃), 156 g of oxalic acid and 190 g of H₂O and shaped to form extrudates having a diameter of 4 mm. These were subsequently calcined stepwise at 200° C. for 2 hours, at 500° C. for 3 hours and at 575° C. for 1 hour.

The catalyst extrudates had a mean cutting hardness of 26 N and gave a conversion of 3.2% in the continuous THF polymerization test.

In this comparative example, the support material $TiO_2$*aq was not precalcined at all. Compared to the catalysts prepared according to the present invention using Variants 1 and 2a, 2b, a catalyst having a low activity was obtained.

We claim:

1. A catalyst which comprises a catalytically active amount of at least one oxygen-containing molybdenum and/or tungsten compound on an oxidic support material said catalyst having a molybdenum and/or tungsten content, based on the finished catalyst, of:

$$x \, \mu mol \text{ of (tungsten and/or molybdenum)}/m^2$$

where $10.1 < x < 20.9$, and a porosity comprising transport pores having a diameter of >25 nm, and a volume of these transport pores of at least 50 mm³/g and which is prepared by the following process steps;

precipitation of the oxidic support material, thermal treatment of the oxidic support material to obtain a BET surface area of 185–220 m²/g at a temperature of from 300 to 550° C.

application of the catalytically active compound(s) or its/their precursor compound(s), to which pore formers have been added, to the support material and calcination of the resulting catalyst at a temperature of from 400° C. to 900° C. to give the finished catalyst.

2. The catalyst of claim 1, wherein the pore former is tartaric acid, citric acid, or oxalic acid.

3. The catalyst of claim 2, wherein the pore former is oxalic acid.

4. The catalyst of claim 1, which has a content of pore formers of up to 200% by weight, based on the catalytically active compound together with the support material.

5. The catalyst of claim 4, wherein the content of pore formers is up to 100% by weight.

6. The catalyst of claim 5, wherein the content of pore formers is up to 60% by weight.

7. The catalyst of claim 1, wherein the oxidic support material is thermally treated at temperatures from 300 to 550° C. to a BET surface area of from 135 to 220/m²/g before the application of the catalytically active compound.

8. The catalyst of claim 1, wherein the oxidic support material has a BET surface area of from 170 to 220 m²/g.

9. The catalyst of claim 8, wherein the oxidic support material has a BET surface area of from 190 to 220 m²/g.

10. The catalyst of claim 1 which has a BET surface area of from 25 to 200 m²/g.

11. The catalyst of claim 10 which has a BET surface area of from 40 to 150 m²/g.

12. The catalyst of claim 10 with a BET surface area of from 50 to 120 m²/g.

13. The catalyst of claim 1 which has an acidity of $Pk_a < -3$ of at least 10 μmol/g.

14. The catalyst of claim 1 which has an acidity at of $pk_a < -3$ of at least 70 μmol/g in the dry state.

15. The catalyst of claim 14, wherein the acidity is at least 90 μmol/g.

16. The catalyst of claim 1 which comprises a catalytically active amount of at least one oxygen-containing tungsten compound.

17. The catalyst of claim 1, wherein the oxidic support material is zirconium dioxide or titanium dioxide.

18. The catalyst of claim 17 wherein the support material is titanium dioxide.

19. The catalyst of claim 1 which contains from 0.1 to 70% by weight of the catalytically active compound(s), calculated as MoO₃ and/or WO₃ and based on the total weight of the catalyst.

20. The catalyst of claim 19 which contains from 5 to 40% by weight of the catalytically active compound.

21. The catalyst of claim 20 which contains from 10 to 35% by weight of the catalytically active compound.

22. The catalyst of claim 1 which contains up to 15% by weight sulfate and/or phosphate.

23. The catalyst of claim 22, wherein the sulfate and/or phosphate content is up to 10% by weight.

24. The catalyst of claim 23, wherein the sulfate and/or phosphate content is up to 8% by weight.

25. The catalyst of claim 1, wherein the thermal treatment of the oxidic support material is carried out under an atmosphere comprising water vapor or steam, which contains >10% by volume of water.

26. The catalyst of claim 25, wherein the water content is up to 20% by volume.

27. The catalyst of claim 26, wherein the water content is up to 30% by volume.

28. The catalyst of claim 25, wherein the support material is freshly precipitated $TiO_2$ aq.

29. A process for preparing polytetrahydrofuran, tetrahydrofuran copolymers, diesters or monoesters of these polymers by polymerization of tetrahydrofuran in the presence of at least one telogen or comonomer using a catalyst as claimed in claim 1.

30. A process as claimed in claim 29 for preparing polytetrahydrofuran.

31. A process as claimed in claim 30 for preparing polytetrahydrofuran from tetrahydrofuran and 1,4-butanediol or H₂O as telogen.

32. A process as claimed in claim 29 for preparing polytetrahydrofuran from tetrahydrofuran and 1,4-butanediol or H₂O as telogen.

33. A process as claimed in claim 29 for preparing polytetrahydrofuran from tetrahydrofuran and carboxylic anhydride.

* * * * *